United States Patent [19]

Palm et al.

[11] 3,717,509

[45] Feb. 20, 1973

[54] COATED METAL AND METHOD

[75] Inventors: Bert E. Palm, Mentor; Earnest W. Harwell, Mansfield, both of Ohio

[73] Assignee: Diamond Shamrock Corporation, Cleveland, Ohio

[22] Filed: Nov. 6, 1970

[21] Appl. No.: 87,626

Related U.S. Application Data

[63] Continuation-in-part of Ser. No. 717,359, March 29, 1968, and a continuation-in-part of Ser. No. 642,133, May 29, 1967, abandoned.

[52] U.S. Cl. ............... 148/6.2, 148/6.16, 117/75, 117/227
[51] Int. Cl. ................................................ C23f 7/26
[58] Field of Search ............. 148/6.2, 6.16; 204/181; 117/132 G, 75, 227

[56] References Cited

UNITED STATES PATENTS

| | | | |
|---|---|---|---|
| 3,242,130 | 3/1966 | Jackopin | 117/75 X |
| 3,351,504 | 11/1967 | DeHart | 148/6.2 X |
| 3,318,716 | 5/1967 | Schuster et al. | 148/6.2 X |
| 2,846,342 | 8/1958 | Curtin | 148/6.16 |
| 2,901,385 | 8/1959 | Curtin | 148/6.16 |
| 3,408,278 | 10/1968 | Stoodley | 204/181 |
| 3,464,906 | 9/1969 | Ridley et al. | 204/181 |
| 3,578,577 | 5/1971 | Gilchrist | 204/181 |
| 2,868,682 | 1/1959 | Dell | 148/6.16 |

Primary Examiner—Ralph S. Kendall
Attorney—Roy Davis, William A. Skinner and John J. Freer

[57] ABSTRACT

A composite coating provides enhanced corrosion protection for metal substrates, can maintain weldability where otherewise desirable and provide a surface for receiving electrocoat paint. The undercoating on the surface of the substrate is the residue obtained from heating an applied corrosion-resistant, hexavalent-chromium-containing coating composition. The coating over such residue results from curing an applied topcoat composition comprising an electrically conductive pigment in a vehicle.

1 Claim, No Drawings

COATED METAL AND METHOD

CROSS REFERENCE TO RELATED APPLICATION

This application is a continuation-in-part of copending U.S. application Ser. No. 717,359, filed Mar. 29, 1968, which application is in turn a continuation-in-part of U.S. application Ser. No. 642,133, filed May 29, 1967, and now abandoned.

BACKGROUND OF THE INVENTION

Hexavalent-chromium-containing coating compositions for metal substrates are applied to metal surfaces from liquid compositions containing hexavalent chromium, often supplied by chromic acid, to typically impart some corrosion resistance and improved paint adhesion to the metal surface. Such coatings have been shown for example, in British Patent 1,033,399 and in U.S. Pat. Nos. 2,559,812, 2,768,104, 2,777,785, 2,846,342, 2,901,385, 2,902,390, 3,063,877, and 3,346,522, and 3,382,081. These coating compositions may contain some trivalent chromium, or the coating can form trivalent chromium compounds during application and/or curing. Coatings thus prepared tend to be non-porous and somewhat amorphous in nature. They can provide initial, limited corrosion protection for the metal substrate, but under rigorous conditions, such as extended exposure to moist, salty air, such protection is of undersirably short duration.

The coating of weldable metal substrates with so-called welding primers containing electrically conductive pigments offers coating protection for such substrates prior to subsequent welding operation. Otherwise it has generally been necessary to coat substrates susceptible to welding operations only after the completion of such welding. Additionally, these primers, containing pigments such as finely-divided carbon or magnetite, or a particulate metal, e.g., zinc, copper, cadmium, or aluminum and which primers have high pigment concentrations, for example, up to about 96 weight percent of pigment, can provide some corrosion protection for the substrate metal. Therefore, such primers may be employed on metal substrates where no subsequent welding operation is contemplated. But, under conditions such as continued exposure to moist, salty air these primers may offer corrosion resistance of limited duration.

It would also be highly desirable, for example in the automotive industry, to have a coating for metal which can be easily and economically applied and that will offer corrosion resistance even after metal forming, and hence before welding. Thus such a coating needs to be highly adherent, must not deleteriously retard substrate weldability, and should most desirably impart corrosion resistance even when the coated metal is scratched to the substrate. Moreover, the general welding operation for high volume production lines is electrical resistance welding, that is typically seam or spot welding, the specifications for which are most usually not met by coatings that would be readily fusion welded, e.g., arc welded. In addition, such desirable coatings must provide a suitable basecoat for subsequent painting, especially electrocoating, even after metal forming and welding.

SUMMARY OF THE INVENTION

It has now been found that when the hexavalent-chromium-containing coating compositions for metal substrates are applied and cured on the surface of such substrates, and the resulting residue is topcoated with an applied and cured welding primer to form a composite coating, such ensuing combination offers execellent, augmented corrosion resistance of unexpected superiority in view of the protection obtained by the individual coatings themselves. Additionally, because of this enhanced protection under corrosive conditions, thin films of the composite may now be employed without sacrifice in corrosion protection. These thin films are highly desirable for application to a metal substrate which will later be subjected to metal forming operations, for example, metal stamping. During extended stamping thin films result in retarded die build-up, i.e., lead to a significant reduction, to virtual elimination, of deleterious film removal during stamping. Moreover, the deposition of thin films now afford by the present invention provides for substantial economy in the use of the topcoating material and furthermore, after application to weldable substrates, permits extended electrical resistance welding free from film pick-up on the electrodes for example, up to 2,000 production spot welds between electrode cleaning. Further, the combination of the present invention offers an excellent base for subsequent paintings, particularly electrocoating.

Broadly, the present invention is directed to a metal substrate having at the surface thereof an adherent, corrosion-resistant composite coating which comprises: (1) an undercoating comprising the residue obtained by applying to the surface a hexavalent-chromium-containing coating composition for metal substrates containing hexavalent-chromium-providing substance and reducing agent therefore, and heating the substrate at a temperature, and for a period of time, sufficient to vaporize volatile substituents from said coating composition and deposit on said surface said residue; and, (2) a topcoating from an applied topcoat composition comprising a particulate, electrically conductive pigment in a vehicle, wherein such electrically conductive pigment is selected from the group consisting of aluminum, copper, cadmium, magnetite, carbon, and zinc.

Additionally, the present invention relates to preparing a metal substrate exhibiting the above-described adherent, corrosion-resistant composite coating and including preparation of a substrate for welding and/or electrocoating. It is further directed to the production of welded and/or electrocoated articles.

The metal substrates contemplated by the present invention are any metal substrates to which a weldable primer topcoat can be, or is, subsequently applied, after a first application of a hexavalent-chromium-containing coating composition. For example, such metal substrates may be aluminum and its alloys, zinc and its alloys, copper and cupriferous, e.g., brass and bronze. Additionally, exemplary metal substrates include cadmium, titanium, nickel and its alloys, tin, lead, chromium, magnesium and alloys thereof, and for weldability, preferably a ferrous metal substrate such as iron, stainless steel, or steel such as cold rolled steel or hot rolled and pickled steel. All of these for convenience are usually referred to herein simply as the substrate.

For convenience, the hexavalent-chromium-containing coating compositions are often referred to herein as undercoat compositions and the residue obtained after application and heating of such undercoat compositions on a metal substrate are also referred to herein for convenience as the undercoating. Likewise, for convenience, the material remaining after application of the weldable primer, or topcoat composition, to such residue, followed by the baking of such topcoat composition, is often referred to herein as the topcoating.

DESCRIPTION OF THE PREFERRED EMBODIMENTS

The corrosion-resistant, hexavalent-chromium-containing coating compositions often contain chromic acid as the hexavalent-chromium-providing substance. But such chromium can be supplied by a salt such as ammonium dichromate, e.g., as taught in U.S. Pat. No. 2,846,342, or by sodium or potassium salts as shown in U.S. Pat. No. 2,559,812, or by substances such as calcium, barium, magnesium, zinc, cadmium, and strontium dichromate as shown for example in U.S. Pat. No. 2,901,385, and/or British Patent 1,033,399. Additionally, the hexavalent-chromium-providing substance might be a mixed chromium compound, i.e., including trivalent chromium compounds as shown in U.S. Pat. No. 3,185,596. Although the coating compositions might contain as little as about 0.25 weight percent of hexavalent chromium, expressed as $CrO_3$, and may contain as much as about 500 grams per liter of composition of hexavalent chromium, expressed as $CrO_3$, such compositions typically contain from several weight percent up to about 100 grams per liter of hexavalent chromium, expressed as $CrO_3$.

In addition to a hexavalent-chromium-providing substance, these coating compositions contain a reducing compound which is typically a polyalcohol or organic acid and many of these useful reducing compounds have been shown for example in U.S. Pat. Nos. 2,559,812, 2,901,385, and 2,777,785. The reducing agent or component is usually present as a single compound which is often organic but can be an inorganic substance, such as potassium iodide, or a hypophosphite reducing agent as shown in U.S. Pat. No. 2,846,342. Organic reducing agents may be very low molecular weight agents such as formaldehyde, disclosed in U.S. Pat. No. 3,063,877 or such high molecular weight materials as polyacrylic acid compounds as taught in U.S. Pat. No. 3,185,596. The reducing agent can be the solution media of the coating composition, as shown in U.S. Pat. No. 2,927,046 and such reducing components may be preformed and stored prior to use, as taught for example in U.S. Pat. No. 3,346,522. The reducing agents may not be added to the coating composition directly, but rather supplied to a metal surface already containing an applied chromic acid solution, i.e., the agents are applied during drying of the chromic acid solution, on the metal surface as shown in U.S. Pat. No. 2,768,103. Combinations of reducing agents may be used, for example, the combination of succinic acid or other dicarboxylic acid of up to fourteen carbon atoms, in mixture with one another, which acids may also be used alone, or in further mixture with one or more substances such as aspartic acid, acrylamide, succinimide, $C_4$—$C_{14}$ aliphatic ketocarboxylic acids, or $C_3$—$C_{18}$ unsaturated aliphatic carboxylic acids. Such dicarboxylic acids and combinations have been disclosed in U.S. Pat. No. 3,382,081, and for enhanced corrosion resistance and retained weldability for the coated substrate, are the preferred agents for the undercoating composition.

Additional substances which may be included in such coating compositions, but, for retaining substrate weldability and for providing a coated surface for receiving an electrocoat paint should be present in very minor amounts, include phosphoric acid or a compound of phosphorous, such as a metallic dihydrogen phosphate, and the phosphate can form part of the coating, as taught in U.S. Pat. No. 2,901,385. The total of phosphorous compounds for subsequent welding or electrocoating should not be present in an amount substantially above about 15 grams per liter of composition.

Other useful compounds often found in hexavalent-chromium-containing coating compositions are manganese compounds which assist in extending the useful life of the coating bath, as disclosed in U.S. Pat. No. 2,777,785, or very minor amounts of pigment, e.g., those as disclosed in British Pat. No. 1,033,399, as well as resinous materials which have been shown in U.S. Pat. No. 3,346,522. However, the presence of more than very minor amounts of such materials, and especially such materials in combination, can deleteriously affect subsequent weldability or application of electrocoat paint. Thus for subsequent electroconductivity, such compositions should contain 0–40 grams per liter of resin, i.e., are substantially resin-free, contain 0–40 grams per liter of pigment, and 0–40 grams per liter of bath extending agents. Such coatings that will be subsequently topcoated are preferably pigment-free.

Additional coating composition components may include a very limited amount of one or more organic and inorganic acids to maintain composition acidity as taught in British Pat. No. 972,072, as well as surface active agents. Such agent may typically be a hydroxyl-containing hydrocarbon ether which includes the alkyl ethers of alkylene glycols, such as butyl ether or propylene glycol, the oxyalkyl ethers of alkylene glycols, e.g., 1-butoxyethoxy-2-propanol, fatty alcohol polyoxyalkylethers, alkylphenol polyoxyalkylethers such as polyoxyethylated nonylphenols, and polyalkylene glycols, e.g. tetraethylene glycol. Other suitable surface active agents which may be used include products prepared from waste sulfite liquors such as lignin sulfonic acids and products from pine wood distillation, e.g., pine oil. To often additionally augment salt spray resistance of the coated substrate, such coating compositions can contain up to about 20 grams per liter of metallic ions, and typically between about 1–10 grams per liter of such ions. These metallic ions include calcium, ferrous, zinc, cobaltous, cupric, manganous, nickelous, and mixtures thereof. However, caution should be taken when introducing such ions into the dispersion to avoid the commensurate introduction of chloride and sulfate ions, since they can act to retard salt spray resistance, and preferably all such substances are present and in minor amounts of about 10 grams per liter or less.

Substantially all of the hexavalent-chromium-containing coating compositions are water based but other liquid materials are used, and typically these are alcohols, e.g. tertiary butyl alcohol, and this particular alcohol has been used in conjunction with high boiling hydrocarbon solvents to prepare the liquid medium for the coating composition, as taught in U.S. Pat. No. 2,927,046, or cholrinated solvents as taught in U.S. Pat. No. 3,437,531. In selection of the liquid medium, typically economy is of major importance, and thus such medium most always contains readily commercially available volatile liquids, i.e., liquids boiling at or below 100°C. at atmospheric pressure. Often the coating compositions are solutions but may be dispersions, e.g., contain a water dispersible reducing agent such as water dispersible polyacrylic acid compounds.

These coating compositions are usually applied to a metal surface either by dipping the article into the coating composition or by spraying the composition onto the metal surface, which surface can be a preheated metal surface to assist in the curing of the coating, as taught in U.S. Pat. No. 2,846,342. However, the coating composition may be used as an electrolytic bath to coat a metal surface employed as a cathode in the bath, as shown in British Pat. No. 972,072. The coating composition may be applied to the metal surface after an etch, e.g., a nitric acid etch, as taught in U.S. Pat. No. 2,768,103, or the reducing agent may be applied after the application of the hexavalent-chromium-containing solution and during drying of such solution on the metal surface, as mentioned hereinabove. The coating composition may be applied from a heated bath, for example one heated up to 200°F. as taught in U.S. Pat. No. 2,768,104. Moreover, after application and curing of the composition the heated metal may be desirably quenched in a solution of chromic acid in water as taught in U.S. Pat. No. 2,777,785.

After application of these coating compositions to a metal substrate, the preferred temperature range for the subsequent heating, which is also often referred to as curing and which may be preceded by drying such as air drying, is from about 200°F., as taught for example in U.S. Pat. No. 3,185,596, but more typically from about 212°F., e.g., as taught in British Pat. No. 972,072. Such an elevated substrate temperature may be attained by preheating the metal prior to application of the coating composition as shown in U.S. Pat. No. 2,846,342. However, such curing temperatures do not often exceed a temperature within the range of about 450°-550°F. to avoid charring or other adverse coating affects as taught in U.S. Pat. No. 2,777,785. At the elevated curing temperatures the heating can be carried out in as rapidly as about 2 seconds or less but is generally conducted for several minutes at a reduced temperature to provide the most corrosion-resistant and adherent coatings.

The resulting weight of the undercoating residue on the metal substrate may vary to a considerable degree, but the residue will most typically always be present in an amount supplying above about 5 milligrams per square foot of chromium, expressed as chromium and not $CrO_3$. For electroconductivity, the undercoating residue contains below about 25 milligrams per square foot or chromium, expressed as chromium and not $CrO_3$, and preferably for enhanced electroconductivity, for example, for extended electrical resistance spot welding, the residue contains below about 20 milligrams per square foot of chromium. Also, if the coated metal substrate is to be subsequently formed, the residue should contain not substantially above about 150 milligrams per square foot of chromium as the coating may be subjected to cracking or crazing during forming operation. For articles where subsequent forming is not contemplated, and extended corrosion resistance is of chief concern, while most desirable electroconductivity need not be achieved, such residue may contain up to about 500 milligrams per square foot of chromium.

The undercoating residue is topcoated with a weldable primer containing an electrically conductive pigment in a vehicle. More particularly, the welding primers are coating compositions containing a particulate, electrically conductive pigment of aluminum, copper, cadmium, steel, carbon, zinc, or magnetite, i.e., the magnetic oxide of iron, and including mixtures thereof such as of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thicknesses for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these primers generally are applied preparatory to subsequent welding of the substrate, they must contain a substantial amount of the electrically conductive pigment, e.g., at least about 30 volume percent pigment for the zinc-rich primers and often more than about 65 percent by volume of particulate pigment, but on a weight basis, because of the density of the zinc, these primers can contain up to about 98 weight percent of such pigment.

In formulating the weldable primers, the binder component can be made up of resins specially selected to afford particular characteristics to the applied coating. Thus the binder components for the zinc-rich primer having the greatest adhesion are polyamide resins combined with epoxy resins, although other binder materials have been found to be compatible with particulate zinc pigment, e.g., polystyrene, chlorinated or isomerized rubber, polyvinyl acetate and polyvinyl chloride-polyvinyl acetate copolymers, alkyd/melamine, and epoxy esters including epoxy ester medium oil content linseed oil. Additionally the formulations can contain flow control agents, as for example urea formaldehyde resins, thixotroping agents such as silica and organic derivatives of magnesium montmorillonite, and anti-settling agents particularly for the aluminum and zinc primers which agents include hydrogenated castor oil and aluminum stearate. Also for the aluminum and zinc primers where gassing can be a problem a gas inhibiting substance such as lime or calcium oxide is generally included in the formulation. Also, these primers usually contain, and/or are typically cut back after formulation but before application with, petroleum derived hydrocarbon liquids such as toluene, benzene, xylene, and synthetically prepared aromatic solvent blends from petroleum. Zinc-rich weldable primers have been more extensively reviewed in an article entitled "Zinc-Rich Paints" in Paint and Varnish Production, April, 1964, p. 35 f.; May, '64, p. 87 f.; and June, '64, p. 47 f.

The final make up of the primer can be dependent upon the method of application of the primer to the treated metal substrate. Typically for primers containing zinc dust or combinations of zinc dust with aluminum flake, or zinc flake with aluminum flake and the like, where such primers are spray applied to the metal substrate they may contain between about 50–80 weight percent of the pulverulent metal and between about 10–30 weight percent of binder. Also such primers generally are formulated with a few weight percent or less of a thixotroping agent, and often with a half weight percent or less of a metallic drier, e.g., a lead, manganese, cobalt or other metallic salt of organic acid, and typically 10–30 weight percent of petroleum dreived hydrocarbon liquid.

However, for such primers which are electrically deposited, they typically contain, based on the weight of the total paint solids, 40–65 weight percent of electrically conductive pigment, e.g., zinc flake or combinations of zinc and aluminum flake, as well as 20–40 weight percent binder plus 5–25 weight percent of one or more extender pigments. However, on a basis of the overall coating bath, such electrodeposited primers can typically contain greater than about 80 weight percent of water medium supplied by deionized water to avoid any reactions between the electrically conductive pigment and water. Additionally, in the overall coating bath, there is usually present in very minor amounts, e.g., a half percent or less, a pigment dispersing agent, such as a metallic stearate, a comparable amount of surfactant, as well as slightly greater amounts of organic solvent, supplied for example by a petroleum distillate.

For those electrically deposited primers, the extender pigment, e.g., rutile or anatase titanium dioxide, zinc oxide, leaded zinc oxide or the like, is included to enhance the uniformity of the deposited primer film. Also, the binders used for such electrodeposited primers are preferably high resistance type resins, thereby permitting the presence of enhanced amounts of extender pigment in the primer formulation. For electrodeposition, such primers are typically coated onto copper, cupriferous, zinciferous, or ferrous metal substrates.

The primer can also be applied to the treated substrate by other various methods, e.g., any of the methods which may be used for application of the hexavalent-chromium-containing coating composition to the substrate, and which have been mentioned hereinabove. Generally to achieve a significant enhancement in augmenting corrosion resistance, the applied primer has a film thickness in excess of about 0.05 mil, but for economy, has a film thickness not substantially in excess of about 6 mils. For electroconductivity, especially for weldability, the primer is present in a thickness not substantially in excess of about 2 mils, and preferably for economy plus electroconductivity is present in a thickness of about 1 mil or less. It will usually provide virtually all, i.e., 90 percent or more of the total coating thickness. The primer is preferably applied to a treated substrate which has first been cooled to a temperature below about 200°F. after curing of the applied liquid composition, since substrate temperatures above about 200°F. may cause excessively rapid evaporation of the volatile components in the primer composition which can result in a discontinous, applied film.

After application the primer is cured, which can often be accomplished simply by air drying at room temperature or by accelerated air drying at an elevated temperature such as 200°F. or higher. Additionally, such drying can be enhanced by catalytic action, for example with a metallic drier including lead, manganese, and cobalt or other metallic salts of organic acids, e.g., cobalt acetate. Such primers as are cured at room temperature by air drying can be ostensibly dry to the touch in as quickly as 10–12 minutes. Many of the weldable primers, e.g., those based on epoxy resin or epoxy/melamine resins for the binder component, are cured at an elevated temperature and for a period of time sufficient to vaporize volatile composition substituents, with the backing temperature being dependent upon the applied film thickness as well as on the particular binder present in the formulation.

For baking, a simple convection oven is preferred as opposed to infrared baking, since the capacity of the zinc and aluminum primers to reflect infrared radiation can lead to inefficient operation. Advantageously, for primers cured at elevated temperatures, they are baked at a temperature within the range of between about 350°–1,000°F. for a time of about 0.5–10 minutes. Temperatures below about 350°F. and times of less than about 0.5 minutes can provide incomplete baking which, especially on mill finished coils, may lead to deleterious film removal, e.g., during coiling. Temperatures above about 1,000°F. can lead to film degradation, e.g., charring of the binder solids, and baking times of greater than about 10 minutes are usually uneconomical. Typically, a zinc-rich primer having an applied film thickness of between about 0.1–3 mils is baked in an oven having an ambient air temperature of about 400°–700°F. and for a time of about 0.5–5 minutes.

The coating composition residue and such residue also which is further topcoated with a weldable primer may also form a particularly suitable substrate for paint deposition by electrocoating. This application may be used with metal substrates as well as other substrates, e.g., polysulfones and other synthetic polymer surfaces, which can withstand curing of the applied coating composition, typically at a temperature as low as about 300°F. or less for compositions in a t-butyl alcohol medium, or a more elevated temperature cure of 350°–400°F., or more, for compositions in aqueous medium.

The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Of particular interest are polycarboxylic acid resins which can be solubilized with polyfunctional amino compounds and include the siccative oil-modified polybasic acids, esters or anhydrides which can be further reacted with divinyl benzene for example or acrylic acid and esters as well as polymerizable vinyl monomers. Such mention of suitable baths for electrodeposition is made herein by way of example and should not be construed as limiting. More exhaustive discussions of such film-forming systems have been set forth, for example, in U. S. Pats. No. 3,304,250 and 3,455,805.

Also, substances of particular interest, for example in the automotive industry, are the anodically deposited film-forming materials which have gained considerable acceptance in this field and are exemplified by U. S. Pat. No. 3,230,162. However, the broad scope to which the electrodeposition of film-forming materials relates, includes the deposition of such materials on anodic or cathodic substrates, and by means of various techniques for passage of current through a bath, including even intermittent pulsed current.

Before starting the treatment of the present invention it is, in most cases advisable to remove foreign matter from the metal surface by thoroughly cleaning and de-greasing. Degreasing may be accomplished with known agents, for instance, with agents containing sodium metasilicate, caustic soda, carbon tetrachloride, trichlorethylene, and the like. The use of a commercial alkaline cleaning composition which combines washing and mild abrasive treatments can be employed for cleaning, e.g., an aqueous trisodium phosphate-sodium hydroxide cleaning solution. In addition to cleaning, the substrate can undergo cleaning plus etching, for example, with a hydrofluoric acid etching agent.

After coating by any of the methods of the present invention, the resulting coated substrate can be further topcoated with any suitable paint, i.e., a paint, primer, enamel, varnish, or lacquer. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints may be applied as mill finishes.

When reference is made herein to the application of weldable primer prior to welding of the substrate, it is to be understood that the subsequent welding under consideration can be spot welding, i.e., localized electrical resistance welding, or seam welding such as with roller electrodes. Typically spot welding may be performed with copper electrodes at electrode pressures from about 100 to about 5,000 pounds, and at 4–5 volts and about 10,000–17,000 amps operating conditions, with a weld time, in cycles, from about 4 to about 400 based on a 60 cycle frequency. When the weldable substrate is susceptible to coating on more than one surface, e.g., a sheet or strip of ferruginous material, the undercoat composition can be applied and cured on all surfaces, and the topcoat composition may be applied only to those surfaces which will be in close proximity or direct contact with the welding electrodes.

The following examples show ways in which the invention has been practiced but should not be construed as limiting the invention. In the examples all temperatures are in degrees Fahrenheit unless otherwise specifically stated. In the examples the following procedures have been employed.

Preparation of Test Panels

Steel test panels (4 × 12 inches, and all being cold rolled, low carbon steel panels) are cleaned by dipping into water, or by spraying with water, which has incorporated therein 2–5 ounces of cleaning solution per gallon of water. The cleaning solution is 25 percent by weight of tetrasodium pyrophosphate, 25 percent by weight of disodium phosphate, and the balance sodium hydroxide, or such cleaning solution is 25 weight percent tripotassium phosphate and 75 weight percent potassium hydroxide. The bath is maintained at a temperature of about 150°–180°F. After the cleaning treatment the panels are rinsed with warm water.

Corrosion Resistance Test (ASTM B–117–64)

Corrosion resistance of coated panels is measured by means of the standard salt spray (fog) test for paints and varnishes, ASTM B–117–64. In this test, the test panels are placed in a chamber kept as constant temperatures where they are exposed to a fine spray (fog) of a 5 percent salt solution for specified periods of time, rinsed in water and dried. The extent of corrosion and film removal on the test panels are then compared one with the other by visual inspection.

Mandrel Test Bending (ASTM D–522)

Adhesion of the composite coating to a metal substrate can be shown by a mandrel band test carried out by the procedure of ASTM D–522. Briefly, the testing method consists in deforming a coated metal panel by fastening the panel tangentially to the surface of a conical steel mandrel and forcing the sheet to conform to the shape of the mandrel by means of a roller bearing, rotatable about the long axis of the cone and disposed at the angle of the conical surface, the angle of deformation or arc travel of the roller bearing being approximately 180°. Qualitative evaluation of coating adhesion can then be readily obtained by simple visual inspection of the deformed workpiece.

Paint Film

The paint film referred to in the examples is a commercial white alkyd enamel topcoat typically applied by dip-coating panels into the enamel. This paint is prepared from a modified alkyd resin based upon a system of partially polymerized phthalic acid and glycerine. The paint contains 50 weight percent solids and has a viscosity of 50 seconds as measured on a No. 4 Ford cup at 70°F. After coating panels with the enamel, the coating is cured by baking in a convection oven for 20 minutes at a temperature of 320°–325°F.

EXAMPLE 1

Three test panels are prepared as described above but only two are undercoated. The two panels are undercoated with 50 milligrams per square foot of undercoat from a composition containing 40 g./l. (grams per liter) of $CrO_3$, 20 g./l. of succinic acid, 10 g./l. of glutaric acid, and 0.5 g./l. of polyoxyethylated nonylphenol. The undercoat is applied by dipping the test panel into such composition, removing and draining excess undercoat composition from the panel, air drying at room temperature until the coating is dry to the touch and baking in an oven at a substrate temperature of 380°–390°F. for 6 minutes.

One undercoated panel and the other of the initial three panels in the test are then coated with a zinc-rich primer having a weight per gallon of 22 pounds, a viscosity of 80 seconds as measured on a number 4 Ford cup after first mixing with 8 volume percent of an aromatic solvent prepared synthetically from petroleum and having a flash point of 145°–150°F., which primer cures to a coating containing 50 percent zinc, by volume. The two primer coated panels are then cured for 90 seconds in an oven heated at 650°F. Both primer coated panels display a cured film thickness of 0.5 mil since the undercoating on the one primer coated panel is insufficient to contribute to the measurable thickness of the coating without much more delicate measurement.

All three panels, i.e., one undercoated only, one primer coated only, and one with both coatings, are subjected to the same corrosion resistance test described hereinbefore. Within merely two hours of testing the solely undercoated panel exhibits extensive salt spray red rust indicating general coating failure and is therefore not tested further.

The other two panels, to determine the development of corrosion from an abraded area in the coatings, are each scribed with an X configuration with the scribe lines being made through the coatings to expose the underlying metal before the corrosion resistance test is performed. After merely 96 hours of the salt spray exposure the panel having only the zinc-rich primer coating exhibits general coating failure. That is, the coating displays extensive blistering which is readily apparent to the unaided eye, as well as substantial red rust over the panel surface. Moreover, such visual inspection shows significant undesirable corrosion away from the scribe lines.

However, the panel having the composite coating, after 312 hours of testing, is ostensibly free from coating failure over the surface of the panel. In addition to maintaining overall film integrity, even after this extensive exposure of 312 hours, the panel further exhibits excellent resistance to undercutting of the composite coating along the scribe lines. Thus, the solely undercoated panel shows general coating failure in only 2 hours, the primer coated panel exhibits such general failure in 96 hours, but the combination coating sustains the same testing for 312 hours while remaining ostensibly free from coating failure.

EXAMPLE 2

A chromate-phosphate coating for additional test panels is prepared in accordance with the teachings of U. S. Pat. No. 2,846,342 and the panels thus coated are referred to in the table below as C-Bond coated panels. This coating is obtained by dipping the panels into a bath containing 40 g./l. of $CrO_3$, 13 g./l. of zinc oxide, 12 g./l. of concentrated phosphoric acid, and 7 g./l. of ethylene glycol, with distilled water being used for the bath medium. After the panels are removed from the bath they are air dried and are subsequently cured for 6 minutes in a convection oven to a metal substrate temperature of 325°F.

Additional panels are coated with a corrosion-resistant, hexavalent-chromium-containing coating composition prepared in accordance with the teachings of U. S. Pat. No. 2,777,785 which coating composition is referred to hereinafter for convenience as the H-Bond coating. This coating composition contains 30 g./l. of $CrO_3$, 15 g./l. of cane sugar, and 1 g./l. of potassium permanganate, with the balance being distilled water. The coating bath is maintained at 90°F. and the panels are dipped into this bath for about 5 seconds and then permitted to air dry at room temperature. Dry panels are then cured in a convection oven for 3 minutes to a metal substrate temperature of 280°F. followed by quenching in a solution containing 5 g./l. of $CrO_3$ maintained at 200°F.

Additional panels are coated with a coating composition prepared in accordance with the teachings of U. S. Pat. No. 2,559,812, which composition is referred to hereinbelow for convenience as the W-Bond coating. This coating composition contains 44 g./l. of $CrO_3$, 22 g./l. sodium chromate, 33 g./l. succinic acid, and 11 g./l. zinc nitrate with the balance of the composition being distilled water. Panels are coated by dipping into the bath of this solution followed by air drying at room temperature. The resulting coated panels are then cured in a convection oven for 6 minutes to a metal substrate temperature of 400°F.

Additional panels, which are referred to hereinafter as D-Bond coated panels are undercoated by dipping into a bath containing 40 g./l. $CrO_3$, 15 g./l. of succinic acid, 7.5 g./l. of succinimide, 0.5 g./l. of polyoxyethylated nonylphenol, with the balance distilled water. After dipping, the panels are removed, excess composition drained from the panels, and they are then air dried at room temperature until the coatings are dry to the touch. Subsequently the panels are cured under infrared lamps for about 1 minute to a substrate temperature of 450°F.

The resulting undercoated panels are then topcoated with a zinc-rich primer having at first a weight per gallon of 23.1 pounds, an initial solids volume of 50 percent, and containing initially 84.5 weight percent of non-volatiles. Prior to use this primer is reduced to a viscosity of 45 seconds as measured on a No. 4 Ford cup with the aromatic solvent described in Example 1. Additional panels which have not been undercoated, but are merely cleaned steel panels, are also coated with this primer. All primer coated panels are then cured for 40 seconds under infrared lamps to a metal substrate temperature of 400°F. All primer coated panels display specific cured film thickness as shown in the table below.

All panels, that is, only undercoated panels, undercoated plus primer coated panels, and only primer coated panels, are subjected to the corrosion resistance test described hereinbefore but without previous scribing before testing as described in Example 1. The results of this test are shown in the table below.

Table

Part A

| Panel Coating | Primer Thickness in Mils | Overall Surface Area Showing Rust |
|---|---|---|
| None—Bare Steel | None | 90%—2 hours |
| D-Bond | None | 50%—2 hours |
| H-Bond | None | 60%—9 hours |
| C-Bond | None | 70%—15 hours |
| W-Bond | None | 50%—15 hours |

| | | 96 Hours | 144 Hours |
|---|---|---|---|
| Primer | 0.5 | 10 | 18 |
| | 0.75 | 20 | 25 |
| C-Bond + Primer | 0.5 | None | None |
| | 0.75 | None | None |
| D-Bond + Primer | 0.5 | <1 | 1 |
| | 0.75 | 2 | 2 |
| H-Bond + Primer | 0.5 | 1 | 4 |
| | 0.75 | 2 | 4 |
| W-Bond + Primer | 0.5 | 3 | 5 |
| | 0.75 | 4 | 5 |

Part B

| Panel Coating* | Time, In Hours, to 5% Overall Surface Rust |
|---|---|
| D-Bond | <2 |
| Primer | 48 |
| D-Bond + Primer | 192 |
| C-Bond | <15 |
| Primer | 48 |
| C-Bond + Primer | 192 |
| H-Bond | <9 |
| Primer | 48 |
| H-Bond + Primer | 192 (6% rust) |
| W-Bond | <15 |
| Primer | 48 |
| W-Bond + Primer | 144 |

*All primer coated panels have 0.5 mils paint thickness.

The results from the above table thus clearly demonstrate the desirable enhancement in corrosion protection obtained by the combination of the hexavalent-chromium-containing coating compositions when used in conjunction with the weldable primer. Although corrosion protection for the individual undercoatings alone can vary extensively, as is evidenced by the first results presented in the table above, nevertheless when such undercoatings are used in combination with the weldable primer all achieve excellent, extended corrosion resistance beyond that shown for the separately tested coating components.

Additional test panels, referred to hereinafter as coupons, containing the W-Bond coating as well as the zinc-rich primer topcoating and having a cured film thickness of 0.5 mil, are subjected to electrical resistance spot welding. This is performed with copper electrodes at an electrode gap of 3/8 inch using a slow closure rate, an electrode pressure of 550 pounds, and using a weld time of 24 half cycles based on a 60 cycle frequency, and a weld heat of 12,500 amp-second. After welding the coupons pull a good button in the peel test. In this test two coupons which have been welded together by at least one spot weld are peeled apart past the weld, thereby tearing the welded spot from one of the coupons. Hence, one coupon has a hole at the spot weld and the other coupon has a button of metal at the place of the spot weld. The electrodes for the welding have a diameter of 0.250 inch. The button pulled from the test coupon, measured across its narrowest apparent diameter with a micrometer calibrated for measuring to the nearest 0.001 inch, is a full 0.240 inch. In view of this, these coupons are considered to be highly suitable for such electrical resistant spot welding.

EXAMPLE 3

A hexavalent-chromium-containing coating composition for additional test panels is prepared in accordance with the teachings of British Pat. No. 972,072. The panels are 4 inches × 6 inches cold-rolled, low carbon steel panels which are cleaned in the manner described hereinbefore. The coating formulation is a bath containing 30 g./l. of $CrO_3$, 50 g./l. of polyacrylic acid compound, 10 g./l. of an 85.5 percent strength phosphoric acid, and 1 g./l. of polyoxyethylated nonylphenol, with the balance being distilled water. A polyacrylic acid compound is a water solution of polyacrylic acid, ammonium polyacrylate, and sodium polyacrylate. This solution has a total solids content of 25 weight percent, a pH of 2–3, a specific gravity of 1.09, and a viscosity at 25°C. as measured at 20 rpm on a Brookfield viscosimeter of 500–1500 centipoise.

To operate the bath, steel panels are selected two at a time for the electrodes and one is electrolyzed as an anode for one second at 6 amps. per panel and the other panel in the bath is electrolyzed as a cathode for one second at a current density of 12 amps. per panel. The cathode panel is removed from the bath and dried for 3 minutes to a metal substrate temperature of 180°C. In the table below these panels are identified as B-Bond coated panels. Several of the resulting B-Bond panels plus several fresh steel panels are then topcoated with the zinc rich primer of Example 2 in the manner described in Example 2, and such topcoated panels are thereafter cured in the manner described in Example 2. All primer coated panels display cured film thicknesses as shown in the Table below.

All panels, i.e., only undercoated panels, only primer coated panels, as well as undercoated plus primer coated panels, are subjected to the corrosion resistance test described hereinbefore, but without previous scribing before testing as described in Example 1. The results of this test are as follows:

Table

| Panel Coating | Primer Thickness in Mils | Overall Surface Area Showing Rust |
|---|---|---|
| B-Bond | None | 40%—6.5 hours* |
| Primer | 0.3 | 15%—48 hours |
| B-Bond + Primer | 0.3 | Rust free—72 hours |

*Average of three panels.

Hence, as the above results show, the combination of the weldable primer plus the electrolytically deposited, hexavalent-chromium-containing coating composition achieves superior corrosion resistance, greatly surpassing in a comparable period of time the protection obtained by the individual coatings themselves which make up the combination.

EXAMPLE 4

Test panels are used to determine topcoat adhesion, during corrosion resistance testing, for paint applied over protected steel substrates. One 4 inches × 12 inches panel is a commercially available protected steel which is an electrogalvanized (flash coated) steel additionally coated with about 200 milligrams per square foot of zinc phosphated conversion coating. A second 4 inches × 12 inches panel is a hot-dipped, minimized spangle, galvanized steel also having the zinc phosphated conversion coating.

The third 4 inches × 12 inches test panel, cleaned in the manner described hereinbefore, is thereafter undercoated with 50 milligrams per square foot of the residue from a hexavalent-chromium-containing coating composition containing 40 g./l. of $CrO_3$, 15 g./l. of succinic acid, 7.5 g./l. of succinimide, and 0.5 g./l. of polyoxyethylated nonylphenol. The undercoat is applied to, and cured on, this third panel in the manner described hereinbefore for the undercoat of Example 1.

This undercoated panel is then primer coated with the zinc-rich primer of Example 1 in the manner described in Example 1. The resulting primer coating is cured by heating the panel in an oven up to a metal temperature of 450°F., which takes about 45 seconds to accomplish, and thereafter water quenching to cool the heated panel. The panel displays a cured film thickness for the primer coating of 0.5 mil. Each of the three panels is thereafter topcoated with the alkyd paint described hereinabove in the manner mentioned hereinabove. Each panel displays a film thickness of one mil for the alkyd paint. Before testing each panel is scribed with an X configuration with the scribe lines being made through the coatings to expose the underlying metal. Each panel is then subjected to the same corrosion resistance test described hereinbefore.

After 240 hours of this salt spray testing the panel containing the electrogalvanized/zinc phosphated/alkyd combination coating shows an apparent blistering paint failure resulting in a maximum paint failure of ⅜-inch, and an average paint failure of ¼-inch, away from the scribe lines. After 408 hours of the salt spray testing the hot-dipped-galvanized/zinc phosphated/alkyd combination likewise exhibits ostensible blistering paint failure, which is a failure of about 3/16-inch maximum, and about ⅛-inch average, away from the scribe lines.

After 408 hours of the salt spray testing the hexavalent-chromium-containing coating/weldable primer/alkyd composite coated panel is virtually free of the blistering paint failure evidenced on the other two panels. Moreover, along the scribe lines, coating integrity is retained except for a merely 1/16-inch maximum, and 1/32-inch average failure away from such lines. Thus this composite displays excellent topcoat paint adhesion, particularly upon comparison with other corrosion-resistant, protective treatments available for steel substrates.

Typically, a composite coating resulting from the deposition, and subsequent curing, resulting in 50 milligrams per square foot of undercoat composition of this Example, and application of a topcoating film of this Example of 0.5 mil thickness, displays excellent film integrity during the mandrel bend testing described hereinbefore, i.e., freedom from apparent film removal during such bending. Additional panels having composite coatings of the present invention in thicknesses of 0.5 mil and less, can readily achieve excellent tensile shear strengths. For example, coated workpieces having ferruginous substrates of 0.036 inches and welded together with an electrode force of 500 pounds at a welding current of about 12,500 amps. and a weld time of about 12 cycles, based on 60 cycle frequency, have average tensile shear strengths of 1,350 pounds, ± 14 percent.

EXAMPLE 5

Test panels are prepared as described above and are coated with a coating composition containing 40 g./l. of $CrO_3$, 15 g./l. of succinic acid, 7.5 g./l. of succinimide and 0.5 g./l. of polyoxyethylated nonylphenol. Panels are coated as described in Example 1 and, as shown in the table below, some panels are cured at 475°F. and others at 450°F. After cooling, all panels are coated with a zinc-rich primer having at first a weight per gallon of 23.1 pounds, an initial solids volume of 50 percent, and containing initially 84.5 weight percent of non-volatiles. Prior to use, this primer is reduced to a viscosity of 45 seconds as measured on a No. 4 Ford Cup with an aromatic solvent prepared synthetically from petroleum and having a flash point of 145°-150°F. Primer coated panels are cured at 475°F. and exhibit a total coating thickness of about 0.5 mil which is virtually equivalent to the primer coating thickness.

Before application of the primer, analysis shows that the undercoated panels cured at 475°F. contain 30 milligrams per square foot (mgms./ft.$^2$) of chromium, and such panels cured at 450°F. contain 14 mgms./ft.$^2$ of chromium. These panels are subjected to the most severe, extended electrical resistance spot welding, such as has found acceptance in the automotive industry. Such stringent, extended electrical resistance spot welding requires that the panels proceed through 2,000 spots with a minimum of misfiring, i.e., with a minimum of welding failures although the panel goes through the weld cycle. To pass the specification of the automobile industry, such a panel must additionally provide a button after 2,000 spots measuring at least 0.220 inch across. The results of such extended spot weld testing are as follows:

TABLE

| Undercoat Chromium* mgms./ft$^2$ | Cure Temp. °F. | Topcoat Thickness, in Mils | Elec. Resis. Spot Welds | | |
|---|---|---|---|---|---|
| | | | No. | Mis-fires** | Button Dia. At 2,000 |
| 30 | 475° | 0.5 | 100 | 22 | N.A. |
| 14 | 450° | 0.5 | 2,000 | 5 | 0.226" |

* Expressed as chromium and not $CrO_3$.
N.A. Not Available; test terminated earlier as failed.
** No weld achieved although panel goes through weld cycle.

As is seen from the above table, the panels containing the 30 mgms./ft.$^2$ of chromium are not acceptable for this stringent, electrical resistance spot welding test, although such coatings may be considered to be weldable where only a few welds would be required. Also, as can be seen from the table, the panels containing the 14 mgms./ft.² of chromium readily pass even this most severe electrical resistance spot welding test, pulling a good button, as well as being essentially free from misfires.

EXAMPLE 6

Test panels are prepared as described above and two series of test panels (B) and (D) are coated with the composition of Example 5 and in the manner of Example 5, except that the dispersing agent is 1 g./l. of heteropolysaccharide dispersing agent. The panels are dried and then baked under infrared lamps at a substrate temperature reaching 450°F. Two of these panels (D) as well as three additional panels (C) are all coated with the zinc-rich primer of Example 5 and in the manner of Example 5. Resulting (C) panels contain a thickness of the primer topcoat of 0.15 mil, 0.36 mil, 0.50 mil, respectively and the (D) panels have a topcoat thickness of 0.2 mil and 0.5 mil, respectively.

All panels (B), (C), and (D) as well as a clean steel panel (A) prepared as described above are all coated with a black-pigment electrocoat primer containing at first 40 percent of non-volatiles which before use is reduced with deionized water in a proportion of 1 part by volume paint to 3 parts by volume water. Panels are immersed in the electrocoat paint bath as anodes and paint is applied typically for 2 minutes at 90 volts. Following removal of the panels from the electrocoating bath, all panels are typically baked for 20 minutes at a temperature of 350°–425°F. After baking, all panels are scribed, the scribing is performed by cutting an X configuration on the face of the panel, the scribe lines being made through the coating to expose the underlying metal. The extent of corrosion along the scribe lines is made by visual inspection and through comparison among test panels.

All panels are subjected to the corrosion resistance test as described hereinbefore. In the table below the results of such corrosion resistance testing are shown. The results are presented as inches of failure of paint adhesion, to the nearest 1/32 of an inch, away from the scribe lines.

TABLE

| Panels | Undercoat | Primer Thickness In Mils | Salt Spray, 120 Hours Scribe | Face |
|---|---|---|---|---|
| A** | No | No | CLA | CLA |
| B | Yes | No Primer | CLA | CLA |
| C | No | 0.15 | 1.5/32 | No. 7,F*** |
|   |   | 0.36 | 2/32 | No. 8,F |
|   |   | 0.50 | 2.5–3.5/32 | No. 8,F |
| D | Yes | 0.2 | 1/32* | O.K. |
|   |   | 0.5 | 0/32 | O.K. |

CLA Complete loss of paint adhesion.
* 240 hours salt spray
** Electrocoated only.
*** Numbers refer to blisters in accordance with ASTM D–714 –56, and F = few.

As can be seen from the above results, the electrocoat primer alone, or the electrocoat primer over only the undercoat, does not provide any desirable paint adhesion. Only the zinc-rich primer under the electrocoat offers unacceptable corrosion resistance along the scribe lines in salt spray testing even at a thickness as great as 0.5 mil for the primer. However, electrocoated panels which first contain the undercoat and then the zinc-rich primer before electrocoating show excellent corrosion resistance. This is exhibited as a freedom from coating failure along scribe lines for a primer thickness of 0.5 mil and for the slight failure with a coating thickness of 0.2 mil, such being a coating failure after the more extended 240 hours of salt spray testing. Thus the combination of the undercoat with the weldable primer topcoat, affords an excellent substrate for subsequent deposition of electrocoat primer.

We claim:

1. The method of preparing a weldable substrate for extended electrical resistance welding and having desirable corrosion resistance, which method comprises:

1. establishing on the surface of said substrate, on at least a portion thereof where welding will take place, the residue from a substantially resin-free hexavalent-chromium-containing coating composition containing a hexavalent-chromium-providing substance and reducing agent therefor, said residue being in an amount sufficient to provide said coating with not substantially above about 25 milligrams per square foot of coated substrate of chromium, thereby establishing a treated metal surface;

2. establishing on the resulting treated metal surface a topcoat primer composition in an amount providing not substantially in excess of about 2 mils of primer, said primer containing a particulate, electrically conductive zinc pigment in a vehicle, said composition containing between about 30–80 volume percent of zinc pigment in admixture with a binder comprising materials selected from the group consisting of polystyrene, chlorinated rubber, isomerized rubber, polyvinyl acetate, epoxy resin, polyamide resin combined with epoxy resin, and polyvinyl chloride - polyvinyl acetate copolymers; and, 3. curing said topcoat composition thereby preparing said substrate for welding with a coating providing corrosion resistance and weldable electroconductivity.

* * * * *